June 5, 1956     J. H. BOOTH     2,748,762
MECHANICAL HEATER AND PUMP
Filed Jan. 29, 1953
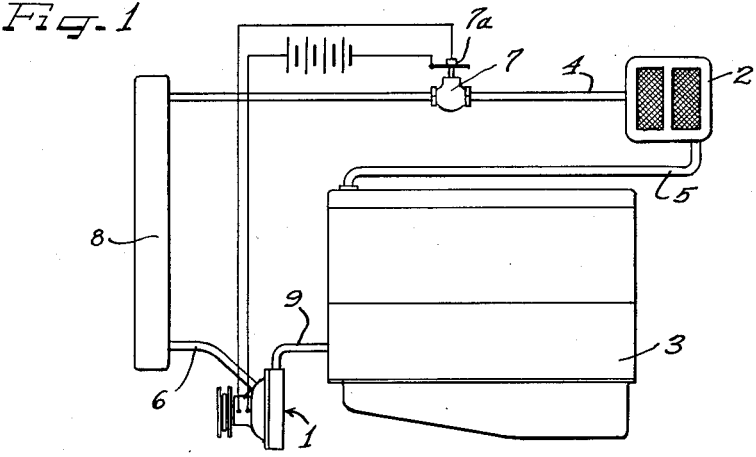
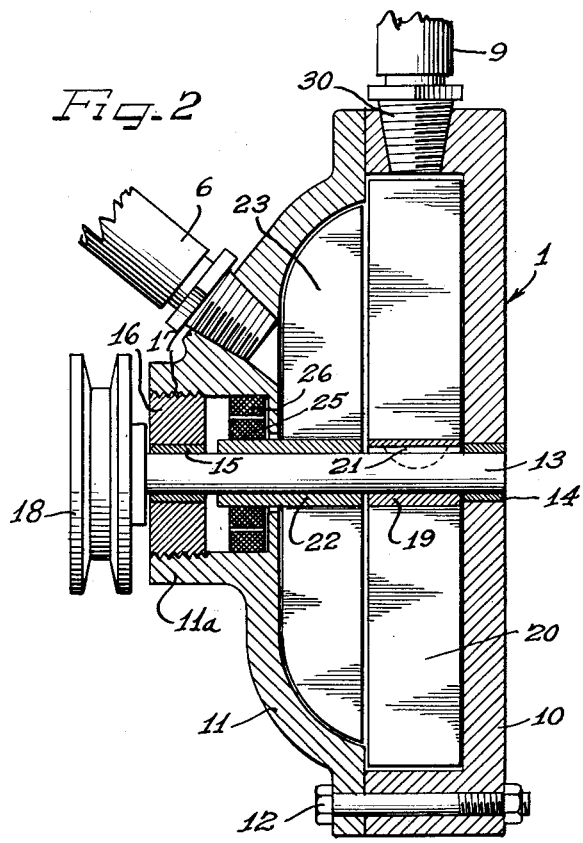
Inventor
JAMES H. BOOTH
by Hill, Sherman, Meroni, Gross & Simpson Attys.

United States Patent Office 2,748,762
Patented June 5, 1956

2,748,762

MECHANICAL HEATER AND PUMP

James H. Booth, Venice Township, Shiawassee County, Mich., assignor to Thompson Products, Inc., Cleveland, Ohio, a corporation of Ohio Application January 29, 1953, Serial No. 333,991

8 Claims. (Cl. 126—247)

The present invention relates to apparatus for heating the interiors of automotive vehicles and the like. More particularly, it concerns a novel apparatus, utilized in conjunction with the standard automotive engines now in general use, which will produce heat for the usual hot water automobile heater, as well as for raising the engine temperature to a desired predetermined figure.

One of the major problems long recognized in the automotive field is that of properly heating the interior of automobiles during the winter season. While there are numerous types of heaters in commercial use today, the most common and the most inexpensive is the hot water type which utilizes the heat in the usual hot water cooling system of the automobile engine. This type of heater is inexpensive and it is also the least dangerous from the point of view of the occupant of the vehicle since there is no danger whatever of leakage of carbon monoxide or other similar engine compartment fumes. Nevertheless it has an inherent disadvantage which is rather serious. This is that the warm-up time, or that time which is required to raise the temperature of the water from atmospheric temperature, at which the vehicle is started, to a higher operating temperature which is the automotive engine cooling water temperature, is much too long. This is especially true in the very cold weather in which it is often found that the warm-up time is actually longer than the total trip time with the result that the automotive heater is not in condition for proper operation until after the need for its services has passed completely.

It is, therefore, an object of the present invention to provide an appartaus which will heat the water utilized in the automobile body compartment heater at a rapid rate, thereby substantially eliminating the formerly required warm-up period.

A further object of the present invention is to provide an extremely simple apparatus for raising the temperature of the water in the automotive cooling system immediately upon starting of the automobile engine.

Yet another object of the present invention is to provide a combined unit which will not only heat the water to be utilized in the automotive heater, but will also circulate it throughout the automotive cooling system.

Yet another object of the present invention is to provide a novel heating apparatus which will selectively supply heat to the automotive hot water system when that system is below a predetermined heating temperature and will also simultaneously operate as a water pump to provide a forced circulation throughout the water system whether or not it is at the same time adding heat thereto.

A feature of the present invention is the provision of a novel engine water heater and pump which takes the place of the usual water pump now conventionally used with vehicle engines.

A further object is the provision of an extremely simple, and inexpensive auxiliary heater and combined water pump which will act to foce circulation throughout the engine hot water system and will simultaneously add heat to the water should the water temperature be below a desired figure.

A further object of the present invention is to provide a combined water pump and hot water heating unit which will substantially eliminate the heretofore warm-up time associated with automotive hot water systems.

Still other and further objects will become apparent to those skilled in the art from a consideration of the attached sheet of drawings in which a preferred embodiment of the apparatus of my invention is shown by way of illustration only.

On the drawings:

Figure 1 is a schematic drawing showing the elements of the usual automotive water circulating system and the relationship of my novel combined water pump and heater thereto; and Figure 2, is an enlarged view, partially in cross-section, of my novel combined auxiliary heater and water pump unit.

As shown on the drawings:

As shown in Figure 1, the combined heater and pump unit 1, which is hereinafter termed "hydro-heater pump," is connected in series with the automotive heater 2 and the power plant 3 by means of conduits 4, 5, and 6. A thermostatic element 7 is provided in a conduit 4 for controlling the operation of the hydro-heater pump 1 as will be explained more fully below.

As is clearly seen in Figure 2, the hydro-heater pump unit comprises a housing 10 having a cover plate 11 secured thereto by a means of bolts 12 or other equivalent fastening means. A pulley shaft 13 is supported in a bearing 14 mounted in the housing 10 and the bearing 15 which is mounted in the collar 16 which is in turn threaded into the neck portion 11a of the cover 11. While a threaded connection is shown at 17 between the collar 16 and the neck 11a, it is of course apparent that the collar 16 can be secured by any conventional means such as for example, by internal, radially expanding spring retainer clips. The shaft 13 is driven from the usual automotive fan belt utilized with such accessories as the generator and water pumps, by means of the pulley 18.

Secured to the shaft 13 within the housing 10 is a vaned rotor having a hub portion 19 with radially projecting vanes 20. The hub 19 is secured to the shaft 13 by conventional means such as a key 21. A cooperating stator having a hub 22 and radially extending vanes 23 is rotatably mounted upon the shaft 13. Although the vanes 20 and 23 are indicated above to be radial it is to be understood that they may be spirally or otherwise shaped in order to accentuate the pumping action. This is possible since the heating effect is dependent on turbulence and therefore it is unnecessary that the coupling be a highly efficient one from the standpoint of power transmission.

While it is contemplated that the stator hub 22 shall run on the shaft 13 utilizing only the fluid in which it is running for lubrication, it is, of course, possible to supply needle bearings or other conventional anti-frictional bearing means between the shaft 13 and the stator hub 22 in order to provide free running connection therebetween.

In order to control the rotation of the stator blade 23, I have provided an electromagnetic brake which comprises electromagnetic elements 25 which are fixedly mounted to the hub 22 for rotation therewith, and the elements 26 which are fixedly secured to the cover 11. I have chosen electromagnetic braking means since such means are readily controllable over wide ranges of torque and are also easily controlled by means of electrical rheostats and other conventional equipment of an inexpensive nature. However, the brakes 25 and 26 may be of any suitable form such as a friction disk brake mechanically or electrically controlled or the electrodynamic coupling known as the "Rabinow" clutch developed by the Bureau of Standards which utilizes magnetic filings in a fluid medium and which is controlled by the passage of current through the medium.

In operation, water passes into the housing 10 through a conduit 6 and is forced radially outwardly by means of the impeller blade 20 to the peripheral outlet 30 which leads to the conduit 9. In normal operation, with no heating required or desired, the stator 23 is permitted to run freely relative to the cover plate 11. In view of this freedom, the stator will tend to rotate with the vanes 20 due to the well known fluid coupling effect therebetween. Should it be desired, however, that the unit be utilized as a heater as well as mere water pump, which operation was explained above, the brake 25 and 26 is energized by means of any suitable electric current and the stator 23 is retarded. Retarding of the stator 23 causes a slippage between the elements 20 and 23 with a resultant turbulence and slip in the coupling which is turned into heat. The heating effect may, of course, be modified by the extent of the braking action of brake members 25 and 26, the maximum heating effect being obtained when the stator is completely stopped relative to the cover 11.

During the time when the stator 23 is slowed or stopped relative to the rotating vanes 20, heat is supplied to the water as it circulates through the housing from the conduit 6 out to the conduit 9. At the same time the vanes 20 operate as usual to provide a centrifugal pump action. In view of this operating feature of the present invention it is contemplated that the housing 10 be substituted for the usual water pump housing found on all present day automobiles and used for circulating cooling water throughout the engine.

In such an installation the conduit 9 leads directly to a cooling water aperture in the lower portion of the motor block while the conduit 6 may lead to a radiator 8 connecting to the top of the automotive engine, or directly to a heater installation, as shown in Figure 1, whichever is desired.

In order to automatically control the operation of the hydro-heater pump combination of this invention, I have provided a thermostatic switch unit 7 in the conduit 4. Through the use of this thermostat, the electromagnetic brake 25, 26 is energized when the temperature of the water is below a desired point. In general automotive practice, it is usually considered satisfactory to dispense with any variation in the retarding effect and hence, to dispense with the use of rheostats in the thermostatic circuits. Under such circumstances, the stator 23 is held completely braked under full current from the battery 31 to the brakes 25 and 26 until such time as the temperature of the fluid in the conduit 4 is sufficiently high to cause the thermostatic element 7 to open the switch 7a to the electromagnetic brake. As soon as the temperature has risen to the desired value, the switch is opened automatically by the thermostatic element and the brakes 25 and 26 are deenergized, allowing the stator 23 to again spin freely on the shaft 13, thereby, completely eliminating the turbulence and slip effects which are necessary in the production of heat.

It is noted that the thermostat 7 may be positioned in any one of the conduits 4, 5, 6, and 9, depending upon the operation desired. If the automobile heater temperature is the critical design temperature, or in other words, the installation is designed to provide a particular temperature at the heater, it is desirable that the thermostat be placed in the conduit 4, since this will provide an accurate indication of the temperature of the water leaving the heater element. However, if it is desired to use the hydro-heater of the present invention to accurately control the vehicle motor cooling system temperature, it is desirable to place the thermostatic element in conduit 5 where it will necessarily indicate the exact temperature of the water leaving the engine block.

It should be noted that the present system provides a superior control for engine temperature and a means for rapidly bringing the temperature up to its optimum operating temperature. For example, in extremely cold weather, it is desired that the temperature of the engine be relatively high in order to provide economical engine operation. By utilizing the combined hydro-heater and water pump of the present invention, it is possible to heat the engine cooling system, not only directly by means of the cylinders, but also by the auxiliary hydro-heater. Through the use of this arrangement it is possible to raise the temperature of the engine to the optimum operating temperature very rapidly, a feature which is very desirable entirely aside from the aspects involving the rapid increasing of the temperature in the automobile heater itself.

It is noted, of course, that the hydro-heater and pump arrangement herein shown need not be in series or even connected with the usual automotive water system. Instead, the heater system may be a completely closed system unto itself with the combined hydro-heater and pump operating to heat and circulate the water through the heating system. In such an installation it is desirable to utilize a rheostat responsive to manual control within the automotive compartment or a thermostatic control responsive to the temperature within the body compartment to control the amount of retardation utilized with the brake 25, 26.

In such a system the conduit 5 would be connected directly to the conduit 9 and the water circuit would not be directly connected in any way to the hot water system of the automotive engine. In such installations, the unit 1 would be auxiliary to the regular water pump and would be mounted on brackets such as those now utilized with the common electrical generator installations.

It will thus be seen that I have provided a novel combination of a hydro-heater and pump unit which can be utilized to circulate water throughout the usual automotive hot water system and at the same time selectively add heat thereto for rapidly raising the temperature of the water to a predetermined desired value. This unit, when substituted for the usual water pumps in automotive water circulating systems, has provided an extremely simple and inexpensive auxiliary heating means for quickly raising the temperature of the system to the optimum operating system and for substantially eliminating the heretofore necessary warm-up time required before automobile body compartment hot water heaters were effective.

It will be understood that modifications and variations may be effected without departing from the scope of the novel concepts of the present invention.

I claim as my invention:

1. A combined hydro-heater and pump comprising a housing, a rotating shaft, a rotor mounted on said shaft for rotation therewith within said housing, a stator element rotatably mounted on said shaft in fluid contact with said rotor, fluid inlet means adjacent the axis of rotation of said rotor, fluid outlet means at the periphery of said rotor, and means for selectively braking said stator element relative to said housing whereby fluid entering said inlet will be heated by turbulence and slippage between said stator and said rotor before being forced from said outlet by the centrifugal force applied by said rotor.

2. A combined heater and pump installation for circulating the water in an automotive hot water and engine cooling system and simultaneously heating said water, which comprises a housing, a rotating vaned pump impeller mounted in said housing, a vaned stator element rotatable in said housing in fluid contact with said impeller and coaxially aligned therewith, an inlet in said housing adjacent the axis of said impeller, an outlet in said axis adjacent the periphery of said impeller, means for braking said stator whereby said impeller rotates relative to said stator causing slippage and turbulence in the water carried between the vanes of said impeller whereby heat is added to said fluid during its passage from said inlet to said outlet.

3. A combined heater and pump installation for circulating the fluid in a heating system and simultaneously selectively heating said fluid, which comprises a housing, a rotating pump impeller having generally radially directed vanes mounted in said housing, a vaned stator element rotatable in said housing, a fluid outlet at the periphery of said housing adjacent to and coaxially aligned with said impeller, inlet means introducing said fluid into said housing at a point adjacent the axis of rotation of said impeller and directing said fluid between said impeller and stator adjacent the center of rotation thereof, and means for braking said stator whereby said impeller rotates relative to said stator causing slippage and turbulence in the fluid carried between the stator and said impeller, thereby adding heat to said fluid during its passage from said inlet in said housing to said outlet in the periphery of the housing, said brake comprising an electromagnetic brake responsive to the temperature of the fluid in said heating system whereby said brake is energized when the temperature of the fluid is below a predetermined desired value.

4. A combined fluid heater and circulating pump comprising a fluid enclosing housing, a rotatable fluid impeller mounted for rotation within said housing, rotatable friction means mounted for coaxial alignment and rotation with said impeller and selectively fixable relative to said housing adjacent to said impeller and cooperating therewith to heat the fluid in said housing when so fixed, said housing having a fluid inlet adjacent the center of rotation of said impeller and a fluid outlet adjacent the periphery of said housing whereby said impeller will cause circulation of said fluid through said housing by centrifugal action.

5. A combined hydro-heater and circulating pump for circulating fluid and simultaneously selectively adding heat thereto and comprising a housing having a shaft mounted for rotation therein, a vaned centrifugal pump impeller secured for rotation with said shaft in said housing, a stator element mounted within said housing for cooperation with said impeller and selectively maintained fixed relative to said housing or rotatable with said impeller, said housing having a fluid inlet adjacent the axis of rotation of said impeller and a fluid outlet adjacent the outer periphery of said housing whereby said impeller will centrifugally circulate water from said inlet to said outlet, and means for selectively controlling said stator to maintain it in its fixed position to thereby cause the frictional addition of heat to said fluid during its circulation.

6. A combined hydro-heater and pump which comprises a stationary fluid filled housing, a rotating shaft, a rotor secured to said rotating shaft in said housing for rotation therewith, a stator element mounted for rotation on said shaft at a point adjacent said rotor, an inlet in said housing near the axis of rotation of said rotor, an outlet in said housing adjacent the outer periphery of said rotor, means for braking said stator relative to said housing to thereby heat fluid in said housing, and vanes secured to said rotor for providing a pumping action to pump the fluid under pressure from said inlet to said outlet.

7. A combined hydro-heater and pump which comprises a housing, a rotor and a stator coaxially mounted in the housing, an inlet near the axis of said rotor, an outlet at the periphery of said rotor, means for rotating said rotor, means for selectively braking said stator relative to said housing to provide heat or for permitting its rotation with said rotor, said rotor having extended vanes whereby fluid which is desired to be heated and circulated is forced by the centrifugal action of said rotor from said inlet to said outlet.

8. A combined fluid heater and circulating pump comprising a housing having a fluid circulating impeller element mounted for rotation therein, and mechanical fluid friction means cooperatively associated with said circulating impeller element and in adjacent coaxial rotational alignment therewith for rotation about an axis common to the axis of said impeller element or for selective fixation relative to said housing to supply heat by friction to said fluid as said fluid is circulated by said circulating impeller element when said friction means is stationary.

References Cited in the file of this patent

UNITED STATES PATENTS

| 1,627,294 | Nydqvist | May 3, 1927 |
| 1,682,102 | Allen | Aug. 28, 1928 |
| 2,291,124 | Wallace | July 28, 1942 |
| 2,562,405 | Altman | July 31, 1951 |

FOREIGN PATENTS

| 169,358 | Great Britain | Sept. 29, 1921 |